Patented Apr. 5, 1927.

1,623,949

UNITED STATES PATENT OFFICE.

IVAN GUBELMANN, HENRY J. WEILAND, AND OTTO STALLMANN, OF SOUTH MIL-
WAUKEE, WISCONSIN, ASSIGNORS TO THE NEWPORT COMPANY, A CORPORATION
OF DELAWARE.

PROCESS OF MAKING GUAIACOL.

No Drawing.  Application filed September 30, 1925. Serial No. 59,735.

This invention relates to the method of manufacture of guaiacol through the decomposition of diazo-o-anisol. This decomposition is ordinarily carried out in the presence of sulfuric acid and its salts, such as copper sulphate, sodium sulphate, ammonium sulphate and others. It was found that no method is described in the literature which gives a yield over 85% of theory. A careful study of the reaction revealed the fact that the use of sulphuric acid alone, or together with its salts, decomposes part of the material through the formation of by-products, which naturally lower the yield of the guaiacol and also its purity.

This invention furnishes an improvement for the manufacture of guaiacol, which reduces the formation of by-products to a minimum and by which yields as high as 95% of theory are obtained. We have discovered that the addition of phosphoric acid or its salts to the reacting substances during decomposition furnishes the most favorable conditions. We prefer the use of tri-sodium phosphate for the reason that the sulphuric acid contained in the diazo solution, which is continuously added to the decomposition mass, is neutralized thereby, but copper phosphate may also be used. The amount of tarry products formed during the decomposition is very small and the formation of volatile by-products is practically avoided. It is obvious that phosphoric acid in place of the tri-sodium phosphate, could be added during the decomposition, if the sulphuric acid were otherwise neutralized, as by the addition of soda ash, caustic soda, or any suitable neutralizing agent.

To illustrate how the formation of guaiacol is accomplished, the following example is given:

123 grams of ortho-anisidine are dissolved in 188 grams of 60° Bé. sulphuric acid and 660 grams of water and 890 grams of ice are added. The ortho-anisidine is then diazotized by the addition of 72 grams of sodium nitrite dissolved in 316 grams of water, at a temperature of below 5° C. The diazo solution thus prepared is run slowly into a boiling solution of 260 grams of crystallized copper sulphate, 42 grams of tri-sodium phosphate and 31.5 grams of sulphuric acid 60° Bé. in 260 grams of water. Heat is applied to the reaction vessel at such a rate as to keep the temperature in the reaction vessel between 102 and 105° C. During the addition of the diazo solution, a solution of 52.5 grams of tri-sodium phosphate in 2100 grams of water is slowly added. The decomposition of the diazo-o-anisol takes place. The yield of guaiacol in the condensate will approach 95% of the theoretical.

It will be understood that the process above cited may be varied without affecting the result obtained. For instance, instead of diazotizing in sulphuric acid solution the diazotization may be effected in phosphoric acid solution. The important point to be observed is not to have free sulphuric acid present during the decomposition process.

We are aware that numerous details of the process may be varied through a wide range without departing from the spirit of this invention, and we do not desire limiting the patent granted other than as necessitated by the prior art.

We claim as our invention:

1. The process of making guaiacol which consists in decomposing diazo-o-anisol in the presence of phosphoric acid salts and copper salts.

2. The process of making guaiacol which consists in decomposing diazo-o-anisol in the presence of copper phosphate and copper sulphate.

3. The process of making guaiacol which consists in adding a diazo-o-anisol solution containing free sulphuric acid to a solution of copper sulphate and simultaneously neutralizing the sulphuric acid by the addition of a trisodium phosphate solution at such a rate that no free sulphuric acid is present in the reaction mass.

4. The process of making guaiacol which consists in adding a diazo-o-anisol solution containing free mineral acid to a solution of copper sulphate and simultaneously neutralizing the mineral acid by the addition of a trisodium phosphate solution.

5. The process of making guaiacol which consists in decomposing diazo-o-anisol in the presence of a phosphoric acid salt, but in the absence of free sulphuric acid.

In testimony whereof we have hereunto subscribed our names.

IVAN GUBELMANN.
HENRY J. WEILAND.
OTTO STALLMANN.